United States Patent
Murphy et al.

(10) Patent No.: US 10,597,603 B2
(45) Date of Patent: *Mar. 24, 2020

(54) OIL RECOVERY AID

(71) Applicants: Polymer Ventures Inc., Charleston, SC (US); Phibro Animal Health Corp., Teaneck, NJ (US)

(72) Inventors: Christopher B. Murphy, Burr Ridge, IL (US); David A Fowlie, Concord, NC (US)

(73) Assignees: POLYMER VENTURES, INC., Charleston, SC (US); Phibro Animal Health Corp, Teaneck, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/446,556

(22) Filed: Mar. 1, 2017

(65) Prior Publication Data

US 2017/0175032 A1 Jun. 22, 2017

Related U.S. Application Data

(60) Continuation-in-part of application No. 15/299,683, filed on Oct. 21, 2016, now Pat. No. 9,938,485, which is a division of application No. 14/969,550, filed on Dec. 15, 2015, now Pat. No. 9,540,588.

(60) Provisional application No. 62/092,553, filed on Dec. 16, 2014.

(51) Int. Cl.
| | |
|---|---|
| *C11B 3/16* | (2006.01) |
| *C08L 71/02* | (2006.01) |
| *B01D 11/04* | (2006.01) |
| *C11B 1/10* | (2006.01) |
| *C11B 13/00* | (2006.01) |
| *B01D 21/01* | (2006.01) |
| *C08G 65/02* | (2006.01) |

(52) U.S. Cl.
CPC ............ *C11B 3/16* (2013.01); *B01D 11/0492* (2013.01); *B01D 21/01* (2013.01); *C08G 65/02* (2013.01); *C08L 71/02* (2013.01); *C11B 1/10* (2013.01); *C11B 1/108* (2013.01); *C11B 13/00* (2013.01); *C08G 2650/58* (2013.01); *C08L 2205/025* (2013.01)

(58) Field of Classification Search
CPC ............ C11B 1/00; C11B 1/108; C11B 13/00
See application file for complete search history.

(56) References Cited

U.S. PATENT DOCUMENTS

| | | | |
|---|---|---|---|
| 6,372,089 B1 | 4/2002 | Keiser et al. | |
| 7,497,955 B2 | 3/2009 | Scheimann et al. | |
| 7,601,858 B2 | 10/2009 | Cantrell et al. | |
| 8,841,469 B2 | 9/2014 | Shepperd et al. | |
| 8,955,685 B2 | 2/2015 | Tran et al. | |
| 8,962,059 B1 | 2/2015 | Froderman et al. | |
| 9,540,588 B2 * | 1/2017 | Murphy | C11B 3/16 |
| 2012/0245370 A1 | 9/2012 | Sheppard et al. | |
| 2013/0209555 A1 | 8/2013 | Sher | |
| 2014/0155639 A1 | 6/2014 | Sticklen et al. | |
| 2014/0171670 A1 * | 6/2014 | Jenkins | C11B 13/00 554/19 |
| 2014/0275589 A1 | 9/2014 | Blankenburg et al. | |
| 2015/0144570 A1 | 5/2015 | Tran et al. | |
| 2015/0284659 A1 * | 10/2015 | Young | C11B 3/006 554/204 |
| 2017/0015938 A1 * | 1/2017 | Xiao | C11B 3/16 |

OTHER PUBLICATIONS

I. R. Schmolka , "Polyalkylene Oxide Block Copolymers" in Nonionic Surfactants, M. Schick, Ed. (Dekker: New York. 1967 pp. 300-335).*

International Search Report and Written Opinion issued for International Application No. PCT/US2015/065743 dated Apr. 20, 2016.

* cited by examiner

*Primary Examiner* — Jeffrey C Mullis
(74) *Attorney, Agent, or Firm* — Marshall, Gerstein & Borun LLP

(57) ABSTRACT

Compositions for increasing corn oil recovery and embodiments of methods for using the composition for corn oil separation are described. The composition(s) incorporate an admixture that includes a polymer selected from a polyglycol ester, a polyethyleneoxide-polypropyleneoxide block copolymer, a poloxamine, or a mixture thereof. The methods include admixing the compositions with a process stream for, for example, the extraction of oil from milled corn and residues from a fermentation step, including stillage (e.g., thin stillage or mid stillage), distiller's wet grain, distiller's dry grain and distiller's dry grains with solubles.

6 Claims, 1 Drawing Sheet

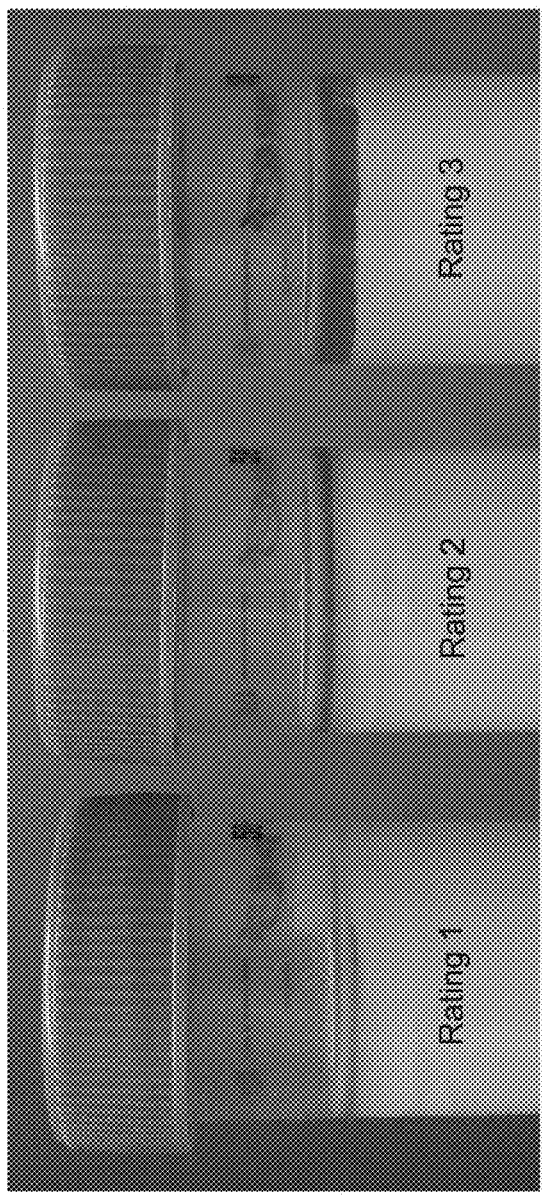

OIL RECOVERY AID

CROSS-REFERENCE TO RELATED APPLICATIONS

This disclosure claims the benefit of priority to U.S. patent application Ser. No. 15/299,683, filed 21 Oct. 2016, which claims priority to U.S. Pat. No. 9,540,588, filed 15 Dec. 2015, which claims priority to U.S. Provisional Patent Application No. 62/092,553, filed 16 Dec. 2014, the disclosures of which are incorporated herein in their entirety.

FIELD OF THE INVENTION

This invention pertains to recovering oil from corn-to-ethanol production processes.

BACKGROUND

There are two types of corn-to-ethanol processing, wet milling and dry milling. The central difference between the two processes is how they initially treat the grain. In wet milling, the corn grain is steeped in water, and then separated for processing in the first step. Dry milling, which is more common, requires a different process.

The corn dry-milling process utilized in the production of ethanol is well known. Post fermentation and distillation, the spent grains are further processed prior to being sold as distiller's grains products. Ethanol plants typically treat whole stillage from the beer distillation column via centrifugation to produce wet cake and thin stillage then further treat the thin stillage stream by subjecting it to multiple effect evaporation to increase the solids and recover the distillate for return use in the process. As solids increase the thin stillage is typically referred to as syrup. The syrup is typically combined with wet cake or distiller's dry grains and sold as animal feed. These processes are well known in the industry and are generally employed in plant design in the industry.

In an effort to take advantage of co-product streams, many plants have added oil removal processes in which the thin stillage (sometimes referred to as syrup) is subjected to processes, such as centrifugation or extraction, to remove corn oil from the thin stillage. For example, the application of centrifuges to the separation of corn oil from thin stillage is in wide use in the fuel ethanol industry. While the theoretical yield of oil per bushel of processed corn is about 2 pounds per bushel, many of the commercial installations fall far short of this. Thus there remains a need to improve the process to maximize the oil yield of the process.

Recently there has been effort directed at increasing the value model of the corn-to-ethanol production process by extracting the oil from the thin stillage byproduct. U.S. Pat. No. 7,601,858 describes a mechanical method of separating the oil from concentrated thin stillage, referred to as the "syrup", using a disk stack centrifuge. U.S. Pat. Appl. No. 2008/0176298 teaches the use of an alkyl acetate solvent for extraction of corn oil in an ethanol production process.

Although the prior art references are effective, there is still opportunity to improve the oil extraction process to further maximize the commercial value of the process. Of particular interest are technologies which do not require the adoption of capital expenditures to implement a new mechanical solution and/or significant process change such as the use of an extraction solvent that requires recycling.

SUMMARY

A first embodiment is a recovery aid that comprises a polymer selected from a polyglycol ester, a polyethyleneoxide-polypropyleneoxide block copolymer, a poloxamine, or a mixture thereof; an additive selected from a nucleant, a salt, or a mixture thereof; and a ratio of the polymer to the nucleant and/or the salt of about 5:1 to about 100:1 (w/w).

A second embodiment is a method for recovering oil from a corn-to-ethanol production process, the method including adding the recovery aid to a process stream, wherein the recovery aid includes a polymer selected from a polyglycol ester, a polyethyleneoxide-polypropyleneoxide block copolymer, a poloxamine, or a mixture thereof.

BRIEF DESCRIPTION OF THE FIGURE

For a more complete understanding of the disclosure, reference should be made to the following detailed description and accompanying FIGURE wherein:

The FIGURE is a photographic comparison of Oil Separation Ratings.

While specific features are illustrated in FIG. 1, with the understanding that the disclosure is intended to be illustrative, these features are not intended to limit the invention described and illustrated herein.

DETAILED DESCRIPTION

The present invention relates to compositions and methods which can be applied to the whole stillage, the thin stillage or the syrup processing operation in corn-to-ethanol production, preferably employing a dry-milling process, to provide for an increase in oil yield.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise. Ratios of materials are, herein, mass ratios (w/w, m/m, or wt. %/wt. %).

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about," even if this term is not expressly stated. Accordingly, unless otherwise indicated, implicitly or explicitly, the numerical parameters set forth are approximations that can depend on the desired properties sought and/or limits of detection under standard test conditions/methods. Furthermore, not all alternatives recited herein are equivalents. Any functional group disclosed herein can be substituted or unsubstituted, unless otherwise indicated herein.

The herein disclosed recovery aid may be added at different points in the separation system. Addition points for the recovery aid include, but are not limited to, to the whole stillage prior to separation into wet cake and thin stillage; a holding tank prior to sending to a centrifuge; a point after the oil-centrifuge feed pump but prior to the intake of the centrifuge; a point after the evaporators and prior to the pump that feeds the centrifuge; a point after the syrup feed tank and before the centrifuge; or combinations of these addition points. Generally the syrup feed tank is located after the evaporators and before the centrifuge.

The herein described recovery aid provides an increase in oil production if added to the processing of the whole stillage, prior to separation of the wet cake or to the thin stillage prior to the oil separation operation. The application of the recovery aid could comprise of one or more addition points within the thin stillage processing unit operation. In some embodiments, the recovery aid is applied to the syrup resulting from concentration of the thin stillage in an evaporator.

Herein, the recovery aid includes a polymer, or a mixture of polymers, selected from a polyglycol ester; a polyethyleneoxide-polypropyleneoxide block copolymer; and a poloxamine. In some embodiments the recovery aid further includes additives. In one instance, the recovery aid is an admixture that includes greater than 50 wt. % of the polymer. In certain instances, the recovery aid includes both the polyglycol ester and the polyethylene oxide-polypropyleneoxide block copolymer. In other instances, the recovery aid includes a plurality of polyglycol esters. In still other instances, the recovery aid includes a plurality of polyethylene oxide-polypropyleneoxide block copolymers.

Preferably, the recovery aid includes at least one additive selected from a nucleant, a salt and a mixture thereof. In some embodiments, the additive consists essentially of the nucleant, or the nucleant and at least one additional additive. In other embodiments, the additive consists essentially of the salt, or the salt and at least one additional additive. In such embodiments, the additive does not include a component that deleteriously affects the recovery aid, such as by reducing its ability to increase oil production. In one instance, the additive consists of the nucleant, or includes the nucleant and at least one additional additive. In another instance, the additive consists of the salt or includes the salt and at least one additional additive. In yet another instance, the additive consists of the nucleant and the salt.

Herein, the salt can be, but is not limited to, an aluminum sulfate, an alkali-metal halide, and alkaline-earth halide, a pyrophosphate, a phosphate, a carbonate, a citrate, an ammonium salt, a ferric salt, a ferrous salt, a phospholipid, and a mixture thereof. Preferably, the salt is water soluble. The aluminum sulfate is preferably potassium aluminum sulfate (potassium alum), generally understood to be the potassium alum hydrate. Other useful aluminum sulfates include sodium aluminum sulfate (soda alum or sodium alum) and ammonium aluminum sulfate (ammonium alum); both generally understood to be their hydrates.

The alkali-metal halide and alkaline-earth halide can be selected from LiCl, LiBr, NaCl, NaBr, KCl, KBr, $MgCl_2$, $MgBr_2$, $CaCl_2$, $CaBr_2$, or mixtures thereof. Preferable alkali-metal halides and alkaline-earth halides include NaCl and $CaCl_2$.

The pyrophosphate can be a sodium and/or potassium pyrophosphate. Preferably, the pyrophosphate is a $(Na/K)_2H_2$ pyrophosphate or tetrasodium pyrophosphate. The phosphate can be, for example, an alkali metal or alkaline earth phosphate including but not limited to (mono/di/tri)-sodium phosphate, (mono/di/tri)-potassium phosphate, a magnesium phosphate, and a calcium phosphate. The phosphate can be diammonium hydrogen phosphate. Furthermore, the phosphate can be a metaphosphate, for example sodium hexametaphosphate. The carbonate can be a sodium, potassium, magnesium, or calcium carbonate; in one instance the carbonate is calcium carbonate ($CaCO_3$).

The citrate can be selected from citric acid, sodium citrate, potassium citrate, or mixtures thereof. The ammonium salt can be an ammonium ion salt, a primary ammonium salt, a secondary ammonium salt, a tertiary ammonium salt, and/or a quaternary ammonium salt. One preferable ammonium salt is ammonium chloride. The ferric and/or ferrous salt can be selected from iron chlorides, iron bromides, iron pyrophosphates, iron phosphates, iron carbonates, iron citrates, and mixtures thereof.

Preferably, the phospholipid is a phosphatidylcholine. More preferably, the phosphatidylcholine has the following formula:

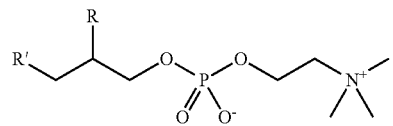

Where R is selected from a hydroxyl, a saturated fatty ester, an unsaturated fatty ester and a hydroxylated fatty ester; where R' is selected from a hydroxyl, a saturated fatty ester, an unsaturated fatty ester, and a hydroxylated fatty ester; and where R and R' are not both hydroxyl. That is, the phosphatidylcholine is preferably a mono- or di-ester where the ester(s) can be esters of saturated fatty acids, unsaturated fatty acids, or hydroxylated fatty acids. Preferably, the esters of the saturated fatty acid, unsaturated fatty acid and/or hydroxylated fatty acid, individually, include 10 to 20 carbon atoms. In one preferable instance, the phospholipid is lecithin.

Herein, the nucleant is a water insoluble particulate, preferably selected from an oxide (e.g., a silicate, an aluminate, a titanate, a zincate, or a mixture thereof). In one instance, the nucleant can be a silicate selected from precipitated silica, fumed silica (or amorphous silica), hydrophobic silica, mineral silicates, mineral aluminosilicates, or a mixture thereof. The mineral silicates and mineral aluminosilicates can be clay minerals of the kaolinite-serpentine group, the pyrophyllite-talc group, the mica group, the vermiculite group, and/or the smectite group. In one preferable instance, the clay minerals are selected from kaolinite, halloysite, bentonite, montmorillonite, and a mixture thereof. In one preferable instance, the nucleant is a silicate (e.g., precipitated silica, fumed silica and hydrophobic silica); in still a more preferable instance, the nucleant is fumed silica.

The recovery aid can further include a viscosity modifier. Herein, the viscosity modifier can be added to adjust the viscosity of the recovery aid, for example, to facilitate better pumping, pouring, or mixing. Preferably, the viscosity modifier is selected from water, glycerol, propylene glycol, a non-esterified glycolate homopolymer, or a mixture thereof. The non-esterified glycolate homopolymer is, preferably, a non-esterified polyethylene glycol or polypropylene glycol with a molecular weight in the range of about 100 to about 25,000 dalton, more preferably in the range of 400 to 10,000 dalton, even more preferably in the range of 500 to 5,000 dalton. In one instance, the viscosity modifier lowers the viscosity of the recovery aid. In examples, the viscosity modifier can be added in amounts ranging from about 1 wt. %, to 5 wt. %, 10 wt. % 15 wt. %, 20 wt. %, 25 wt. %, 30 wt. %, 35 wt. %, 40 wt. %, 45 wt. %, 50 wt. %, 60 wt. %, 70 wt. %, or 80 wt. % of the recovery aid composition.

In one preferable example, the recovery aid admixture includes a polyglycol ester, a polyethyleneoxide-polypropyleneoxide block copolymer, at least one additive, and a viscosity modifier. More preferably the recovery aid admixture consists of a polyglycol ester, a polyethyleneoxide-polypropyleneoxide block copolymer, at least one additive, and a viscosity modifier. In one instance, the additive includes the phospholipid and at least one additional additive. In another instance, the additive includes an aluminum sulfate and at least one additional additive. In still another instance, the additive includes a nucleant and at least one additional additive.

Herein, the polyglycol ester can be selected from a polyethylene glycol (PEG) monoester, a PEG diester, a polypropylene glycol (PPG) monoester, a PPG diester, or a mixture thereof. In one instance, the polyglycol ester is a PEG ester; in another instance, the polyglycol ester is a PPG ester; in still another instance, the polyglycol ester is an admixture of a PEG ester and a PPG ester.

As is well understood in the chemical arts, esters include a carboxylate functionality. The esters described herein comprise a —C(O)R" group, wherein R" comprises an alkyl group, an alkenyl group, a alkynyl group, a cycloalkyl group, or a mixture thereof which includes about 10 to 20 carbon atoms, 10 to 18 carbon atoms, 10 to 16 carbon atoms, 10 to 14 carbon atoms, or 10 to 12 carbon atoms. In some instances, the ester is derived from coupling a fatty acid, for example an unsaturated fatty acid or a saturated fatty acid, with a polyglycol. The polyglycol ester can be, for example, a polyglycol functionalized with one or more (e.g., mono- or di-) fatty acids selected from capric acid, lauric acid, myristic acid, palmitic acid, stearic acid, or arachidonic acid.

In some embodiments, the polyglycol, which can be a polyethylene glycol or polypropylene glycol, has a weight average molecular weight of about 300 to about 800 dalton. In some embodiments, the polyglycol can have a $MW_w$ of about 300, 400, 500, 600, 700, or 800 dalton.

The polyethyleneoxide-polypropyleneoxide block copolymer is, preferably, selected from a diblock polymer, a triblock polymer, and a mixture thereof. Herein, the diblock polymer can be a polyethyleneoxide-polypropyleneoxide (PEO-PPO) copolymer. The triblock polymer can be a PEO-PPO-PEO or a PPO-PEO-PPO copolymer. In one preferable instance, the polyethyleneoxide-polypropyleneoxide block copolymer is a poloxamer (a triblock polymer with a hydrophobic core). The poloxamer can have a core molecular weight of about 1,000 to about 3,000 dalton, or about 1,500 to about 2,500 dalton. Irrespective of whether the polyethyleneoxide-polypropyleneoxide block copolymer is a diblock or a triblock polymer, the polyethyleneoxide-polypropyleneoxide block copolymer can have a number average molecular weight of about 500 to about 30,000, about 500 to about 20,000, about 500 to about 10,000, about 1,000 to about 10,000, about 1,000 to about 7,500, about 1,000 to about 5,000, about 1,500 to about 4,500 dalton, or about 2,000 to about 4,000 dalton.

In another instance, the polymer can be a poloxamine. Herein a poloxamine is a polymer that includes a plurality of polyglycols, polyglycol esters, and/or polyethyleneoxide-polypropyleneoxide groups joined by an amine. For example, the poloxamine can include a secondary amine and/or a tertiary amine. In one example, the poloxamine can have the formula $(R^1)_2N[(CH_2)_mNR^1]_pR^1$, wherein each $R^1$ is, independently, selected from a hydrogen atom, a hydroxyethyl group (e.g., —CH$_2$CH$_2$OH), a hydroxypropyl group (e.g., —CH$_2$CH(OH)CH$_3$ or —CH$_2$CH$_2$CH$_2$OH), a polyethyleneoxide group (e.g., —[CH$_2$CH$_2$O]$_x$—H, wherein x is an integer ranging from 2 to about 500, 400, 300, 200, or 100), a polypropyleneoxide group (e.g., —[CH$_2$CH(CH$_3$)O]$_x$—H or —[CH$_2$CH$_2$CH$_2$O]$_x$—H, wherein x is an integer ranging from 2 to about 500, 400, 300, 200, or 100), a polyethyleneoxide-polypropyleneoxide group (e.g., —[CH$_2$CH$_2$O]$_x$—[CH$_2$CH(CH$_3$)O]$_x$—H or —[CH$_2$CH$_2$O]$_x$—[CH$_2$CH$_2$CH$_2$O]$_x$—H, wherein each x is, independently, an integer ranging from 2 to about 500, 400, 300, 200, or 100), a polypropyleneoxide-polyethyleneoxide group (e.g., —[CH$_2$CH$_2$CH$_2$O]$_x$—[CH$_2$CH$_2$O]$_x$—H or —[CH$_2$CH(CH$_3$)O]$_x$—[CH$_2$CH$_2$O]$_x$—H, wherein each x is, independently, an integer ranging from 2 to about 500, 400, 300, 200, or 100), a glycol (e.g., —(CH$_2$)$_y$OH, wherein y ranges from 1 to 20, 1 to 10, 1 to 5, or 1 to 2), a glycol ester (e.g., —(CH$_2$)$_y$OC(O)R", wherein R" comprises an alkyl group, an alkenyl group, a alkynyl group, a cycloalkyl group, or a mixture thereof which includes about 10 to 20 carbon atoms, 10 to 18 carbon atoms, 10 to 16 carbon atoms, 10 to 14 carbon atoms, or 10 to 12 carbon atoms; and y ranges from 1 to 10, 1 to 5, or 1 to 2), a polyglycol (e.g., —[(CH$_2$)$_y$O]$_z$—H wherein z is an integer ranging from 2 to about 500, 400, 300, 200, or 100, and y ranges from 1 to 10, 1 to 5, or 1 to 2), or a polyglycol ester (e.g., —[(CH$_2$)$_y$O]$_z$—C(O)R", wherein R" comprises an alkyl group, an alkenyl group, a alkynyl group, a cycloalkyl group, or a mixture thereof which includes about 10 to 20 carbon atoms, 10 to 18 carbon atoms, 10 to 16 carbon atoms, 10 to 14 carbon atoms, or 10 to 12 carbon atoms; z is an integer ranging from 2 to about 500, 400, 300, 200, or 100; and y ranges from 1 to 10, 1 to 5, or 1 to 2). In one instance, the amine is a diamine, for example an ethylenediamine; in another instance, the amine can be a bisethylenetriamine; in still another instance, the amine can be an alkanolamine (e.g., ethanolamine). In one particularly preferable instance, the amine is a bis-tertiary ethylenediamine comprising four polyglycols, polyglycol esters, and/or polyethyleneoxide-polypropyleneoxide block copolymers. One particular poloxamine can be a tetrakispolyethyleneoxide-polypropyleneoxide block ethylene diamine; another poloxamine can be a tetrakispolyglycol ethylenediamine. In yet another instance, the poloxamine can be a quaternary poloxamine. That is, one or more amines of the poloxamine can be a quaternary amine, preferably, wherein the quaternary amine carries a methyl group. In one example, the poloxamine can be a methyl(poloxammonium) chloride. In still another instance, the poloxamine can have an average molecular weight in a range of about 1,000 to about 25,000, about 1,000 to about 20,000, about 1,000 to about 18,000, about 2,000 to about 15,000, or about 4,000 to about 8,000 dalton.

In one preferred example, the recovery aid includes about 10 wt. % to about 90 wt. % of the polyglycol ester; and about 10 wt. % to about 90 wt. % of the polyethyleneoxide-polypropyleneoxide block copolymer. More preferably, the recovery aid includes about 10 wt. % to about 80 wt. % of the polyglycol ester; and about 10 wt. % to about 80 wt. % of the polyethyleneoxide-polypropyleneoxide block copolymer. Even more preferably, the recovery aid includes about 10 wt. % to about 70 wt. % of the polyglycol ester; and about 10 wt. % to about 70 wt. % of the polyethyleneoxide-polypropyleneoxide block copolymer. In another preferred example, the recovery aid admixture includes about 75 wt. % to about 95 wt. % of a combination of the polyglycol ester and the polyethyleneoxide-polypropyleneoxide block copolymer. In still another preferred example, the recovery aid admixture includes about 75 wt. % to about 95 wt. % of a combination of a polyglycol monoester, a polyglycol diester, and a poloxamer. In one preferable instance, the recovery aid admixture includes about 0.5 wt. %, 1 wt. %, 2 wt. %, 3 wt. %, 4 wt. % or 5 wt. % to about 5 wt. %, 6 wt. %, 7 wt. %, 8 wt. %, 9 wt. %, or 10 wt. % of the nucleant. In another preferable instance, the recovery aid admixture includes about 0.5 wt. %, 1 wt. %, 2 wt. %, 3 wt. %, 4 wt. % or 5 wt. % to about 5 wt. %, 6 wt. %, 7 wt. %, 8 wt. %, 9 wt. %, or 10 wt. % of the salt. In one instance, the recovery aid admixture can additionally include about 1 wt. %, 2 wt. %, 5 wt. %, or 10 wt. % to about 15 wt. %, 20 wt. %, 25 wt. %, or 30 wt. % phospholipid.

Notably, the recovery aid can be admixed with the process stream (see below). Accordingly, the recovery aid (alone or in combination with the process stream) can include a ratio (w/w) of the polymer to the nucleant and/or a ratio of the polymer to the salt. In one instance the recovery aid includes a ratio of the polymer to the nucleant of about 5:1 to about 100:1, about 10:1 to about 100:1, about 25:1 to about 100:1, about 30:1 to about 100:1, about 40:1 to about 100:1, about 30:1 to about 50:1, or about 40:1 to about 50:1. In another instance, the recovery aid can include a ratio of the polymer to the salt of about 5:1 to about 100:1, about 10:1 to about 100:1, about 25:1 to about 100:1, about 30:1 to about 100:1, about 40:1 to about 100:1, about 30:1 to about 75:1, or about 40:1 to about 60:1. In still another instance, the recovery aid can include a ratio of the polymer to the nucleant and/or the salt of about 5:1 to about 100:1, about 10:1 to about 100:1, about 25:1 to about 100:1, about 30:1 to about 100:1, about 40:1 to about 100:1, about 30:1 to about 75:1, or about 40:1 to about 60:1.

In a preferable instance, the polymer and the nucleant are admixed and produce a homogeneous polymer-nucleant composition. Herein, the unaged (within 48 hours of admixing) polymer-nucleant composition is determined to be homogeneous if the material passes a Centrifuge Test. The Centrifuge Test is conducted by placing the material in a centrifuge vial and spinning the material for thirty minutes, preferably, one hour at 2,500 rpm. The material passes the Centrifuge Test if there is no separation of materials. The polymer nucleant interaction can be a physisorption and/or a chemisorption process. In one example, the polymer is a polyethyleneoxide-polypropyleneoxide block copolymer and the nucleant is a silicate. The admixing to produce the homogeneous polymer-nucleant composition can include subjecting the materials to a paddle mixer, blender, extruder, injection molding machine, banbury type mixer, brabender type mixer, pin-mixer, rotor-stator mixer, and/or a centrifugal mixer.

An additional embodiment is the application of the above described recovery aid in the recovery of oil. In one example, the recovery aid is employed in a method for recovering oil from a corn-to-ethanol production process. In one instance, this method includes adding the recovery aid to a process stream (for example, to the slip stream evaporator flow). Preferably and importantly, the addition of the recovery aid increases a yield of oil from the production process.

The recovery aid can be added to the process stream (whole stillage, thin stillage or syrup) in an amount of from about 10 to about 5000 ppm based on the weight of the process stream (relative to the process stream flow rate (GPM)), from about 10 to about 2500 ppm, from about 10 to about 1000 ppm, from about 10 to about 500 ppm, from about 10 to about 100 ppm, or from about 10 to about 50 ppm. Preferably, the recovery aid is added to the process stream (whole stillage, thin stillage or syrup) in an amount of at least about 10 ppm, 25 ppm, or 50 ppm. Preferable, the amount of recovery aid is less than 10,000 ppm, less than 5,000 ppm, less than 2,500 ppm, less than 1,500 ppm, less than 1,000 ppm, less than 500 ppm, or less than 250 ppm.

These chemistries may be applied under the normal ranges of temperatures, pressures, and pH's found in a variety of the process stream typical of commercial operations.' For example, according to, but not limited by, U.S. Pat. No. 7,602,858, a preferred composition of the syrup, resulting from concentration of thin stillage, for centrifugal separation of the oil has a temperature between 65-100° C., a pH between 3-6, and a moisture content of between 15-90 wt. %.

The recovery aid can be heated and applied to the process stream (including whole stillage, thin stillage, and/or syrup) at a temperature in the range of from 18° C. to 100° C., preferably from 25° C. to 85° C., more preferably from 30° C. to 80° C. In one preferable instance, the recovery aid is added to a syrup line just before centrifugation. In another instance, the recovery aid can be pre-dispersed in a solvent (e.g., water (e.g., at a temperature of about 20° C. to about 80° C.) or ethanol from the plant) and then injected into the syrup line. In still another instance, the recovery aid is admixed with the syrup in a holding tank prior to sending this admixture to the centrifuge.

Preferably, the herein disclosed recovery aid provides improved oil recovery from corn oil syrup. The improved oil recovery can be gauged on an Oil Separation Rating scale of 0-3, wherein 0 is no change in the corn oil syrup. The Oil Separation Rating can be determined by mixing the recovery aid with the corn oil syrup, shaking the mixture vigorously for 5 seconds, centrifuging at 5000 rpm, holding for 1 minute, and then slowly stopping the centrifuge using the break setting. Oil separation was rated on a 1-3 ranking: (1) shows little to no oil separation; (2) shows moderate oil separation; and (3) shows large amounts of oil separation. FIG. 1 is a pictorial reference for the oil separation ranking. Further details can be found in the Examples. Even more preferably, the components of the recovery aid act synergistically to provide an Oil Separation Rating that is greater that the individual parts.

Notably, there is a negative impact on the resale value of dry distiller's grain (DDG) if syrup is processes at high temperatures to improve the oil recovery yield. For example, temperatures greater than 90° C. can discolor the syrup and impart a negative appearance to the dry distiller's grain (DDG) which lessens the value of this material. Additionally, the higher processing temperatures can discolor the oil itself. As such, an added benefit of the invention is the ability to increase the oil yield at lower processing temperatures and mitigate the potential of the processed syrup to negatively impact the appearance and value of the DDG and the oil. Reducing processing temperatures also leads to overall energy savings.

EXAMPLES

The following examples and embodiments are intended to illustrate, not limit, embodiments of the disclosure. In the following examples, polymers selected from a polyglycol ester and a polyethyleneoxide-polypropyleneoxide block copolymer were utilized for corn oil recovery pursuant to the above provided descriptions. On a laboratory scale, recovery aid compositions were combined with corn oil syrup obtained directly from a corn-to-ethanol plant. On an industrial scale, one recovery aid composition was run in a commercial corn to ethanol plant to evaluate industrial performance and compare corn oil recovery against other compositions.

A recovery aid including a polyglycol ester was evaluated. The following samples were prepared for comparative testing:
1. Silica: 98 g distilled water was added to a 200 ml beaker and agitated at 500 rpm using a 3 blade propeller mixer. 2 g of fumed silica was added and mixed for 30 minutes.
2. Alum: 97 g distilled water was added to a 200 ml beaker and agitated at 500 rpm using a 3 blade propeller mixer. 3 g of fumed iron-free alum was added and mixed for 30 minutes.
3. Polyglycol ester: 85 g of a polyglycol ester was added to a 200 ml beaker and agitated at 500 rpm using a 3 blade propeller mixer. 15 g of distilled water were added and mixed for 30 minutes.
4. Polyglycol ester+Silica: 85 g polyglycol ester was added to a 200 ml beaker and agitated at 500 rpm using a 3 blade propeller mixer. 2 g of fumed silica and 13 g of distilled water were added and mixed for 30 minutes.
5. Polyglycol ester+Alum: 85 g polyglycol ester was added to a 200 ml beaker and agitated at 500 rpm using a 3 blade propeller mixer. 3 g of iron-free alum and 12 g of distilled water were added and mixed for 30 minutes.
6. Polyglycol ester+Silica+Alum: 85 g polyglycol ester was added to a 200 ml beaker and agitated at 500 rpm using a 3 blade propeller mixer. 3 g of iron-free alum, 2 g of fumed silica and 10 g of distilled water were added and mixed for 30 minutes.

Separation testing: Corn oil syrup was obtained from a Midwestern ethanol plant. Centrifuge tubes (50 mL) were dosed with 300 ppm of samples 1-6 (above) and 45 ml of syrup at 73.8° C. The mixture was shaken vigorously for 5 seconds, centrifuged at 5000 rpm and held for 1 minute, and then slowed to stop using the break setting. Oil separation was rated on a 1-3 ranking: (1) shows little to no oil separation; (2) shows moderate oil separation; and (3) shows large amounts of oil separation. FIG. 1 is a pictorial reference for the oil separation ranking.

Table 1 shows separation test results for samples 1-6:

|   | Wt. % Polyglycol Ester | Wt. % Silica | Wt. % Alum | Wt. % water | Oil Separation Rating |
|---|---|---|---|---|---|
| 1 | 0 | 2 | 0 | 98 | 1 |
| 2 | 0 | 0 | 3 | 97 | 1 |
| 3 | 85 | 0 | 0 | 15 | 1 |
| 4 | 85 | 2 | 0 | 13 | 2 |
| 5 | 85 | 0 | 3 | 12 | 2 |
| 6 | 85 | 2 | 3 | 10 | 3 |

A recovery aid including a polyethyleneoxide-polypropyleneoxide block copolymer was evaluated. The following samples were prepared for comparative testing:
7. Silica: 98 g distilled water was added to a 200 ml beaker and agitated at 500 rpm using a 3 blade propeller mixer. 2 g of fumed silica were added and mixed for 30 minutes.
8. Alum: 97 g distilled water was added to a 200 ml beaker and agitated at 500 rpm using a 3 blade propeller mixer. 3 g of iron-free alum were added and mixed for 30 minutes.
9. Polyethyleneoxide-polypropyleneoxide block copolymer: 85 g of a EO-PO copolymer was added to a 200 ml beaker and agitated at 500 rpm using a 3 blade propeller mixer. 12 g of distilled water were added and mixed for 30 minutes.
10. Polyethyleneoxide-polypropyleneoxide block copolymer+Silica+Alum: 85 g EO-PO copolymer were added to a 200 ml beaker and agitated at 500 rpm using a 3 blade propeller mixer. 3 g of iron-free alum, 2 g of fumed silica and 10 g of distilled water were added and mixed for 30 minutes.

Separation testing: corn oil syrup was obtained from a Midwestern ethanol plant. Centrifuge tubes (50 mL) were dosed with 150 ppm of samples 7-10 (above) and 45 ml of syrup at 83.5° C. The mixture was shaken vigorously for 5 seconds, centrifuged at 5000 rpm and held for 1 minute, and then slowed to stop using the break setting. Oil separation was rated on a 1-3 ranking: (1) shows little to no oil separation; (2) shows moderate oil separation; and (3) shows large amounts of oil separation. FIG. 1 is a pictorial reference for the oil separation ranking.

Table 2 shows separation test results for samples 7-10:

|   | Wt. % EO-PO polymer | Wt. % Silica | Wt. % Alum | Wt. % water | Oil Separation Rating |
|---|---|---|---|---|---|
| 7 | 0 | 2 | 0 | 98 | 1 |
| 8 | 0 | 0 | 3 | 97 | 1 |
| 9 | 85 | 0 | 0 | 15 | 1 |
| 10 | 85 | 2 | 3 | 10 | 2 |

A recovery aid including an ethylenediamine(tetra(polyethyleneoxide-polypropyleneoxide)) was evaluated. The following samples were prepared for comparative testing:
11. Ethylenediamine(tetra(polyethyleneoxide-polypropyleneoxide): 85 g of a ethylenediamine EO-PO copolymer was added to a 200 ml beaker and agitated at 500 rpm using a 3 blade propeller mixer. 15 g of distilled water were added and mixed for 30 minutes.

Separation testing: Sample 11 was tested in the same procedure as samples 7-10. Table 3 shows the separation test results for sample 11:

|   | Wt. % EO-PO polymer | Wt. % Silica | Wt. % Alum | Wt. % water | Oil Separation Rating |
|---|---|---|---|---|---|
| 11 | 85 | 0 | 0 | 15 | 3 |

A plant trial was conducted in a commercial ethanol plant in the United States. A recovery aid including polyethyleneoxide-polypropyleneoxide block copolymer, silica, and alum (85:2:3) was compared to another commercial product. The commercial product was run at a rate of 100 ml/min into the syrup line just ahead of the centrifuge. The 100 ml/min rate was determined by the plant to be the optimized dosage and resulted in an oil rate of 30.59 pounds/min of oil over a 24 hour period. The recovery aid including polyethyleneoxide-polypropyleneoxide block copolymer, Silica, and Alum (85:2:3) was run continuously for one week and was optimized by plant personnel to a dosage rate of 65 ml/min resulting in an oil separation rate of 33.86 lbs./min of oil per 24-hour period.

A recovery aid without an additive was evaluated. Samples of the recovery aid were separation tested by direct addition to a corn oil syrup or by dissolution in a viscosity modifier and then addition to the corn oil syrup.

Separation testing of recovery aid by direct addition: Corn oil syrup was obtained from a Midwestern ethanol plant. Centrifuge tubes (50 mL) were dosed with 45 ml of syrup at 78° C. and then 150, 200, 250, 300, or 350 ppm of the recovery aid polymer. The mixture was shaken vigorously for 5 seconds, centrifuged at 5000 rpm and held for 1 minute, and then slowed to stop using the break setting. Oil separation was rated on a 1-3 ranking: (1) shows little to no oil separation; (2) shows moderate oil separation; and (3) shows large amounts of oil separation. The recovery aid polymer(s) are designated by commercial product codes. These designations refer to commercially available polymers where the Pluronic series (BASF) are block copolymers based on ethylene oxide and propylene oxide (e.g., polyethyleneoxide-polypropyleneoxide block copolymer) and the Tetronic series (BASF) are tetra-functional block copolymers based on ethylene oxide and propylene oxide (e.g., ethylenediamine(tetra (polyethyleneoxide-polypropyleneoxide))). Table 4 shows the separation test results for direct addition of the recovery aid polymer to the syrup.

TABLE 4

| | | Dosage ppm | | | | |
|---|---|---|---|---|---|---|
| Recovery Aid | Designation | 150 | 200 | 250 | 300 | 350 |
| 12 EO-PO | Pluronic 31 | 1 | 1 | 1 | 1 | 1 |
| 13 polymer | Pluronic 62 | 1 | 2 | 1 | 2 | 2 |
| 14 | Pluronic 64 | 2 | 2 | 3 | 3 | 3 |
| 15 | Pluronic 122 | 1 | 1 | 1 | 1 | 1 |
| 16 | Pluronic 90R4 | 1 | 1 | 1 | 1 | 1 |
| 17 poloxamine | Tetronic 701 | 1 | 1 | 1 | 2 | 2 |
| 18 | Tetronic 904 | 2 | 2 | 2 | 2 | 2 |

Samples 19-31 were prepared analogous to example 11 above. Separation testing: Corn oil syrup was obtained from a Midwestern ethanol plant. Centrifuge tubes (50 mL) were dosed with 45 ml of syrup at 78° C. and then with the recovery aid to provide 150, 200, 250, 300, or 350 ppm of the polymer (samples 19-24 and 26-28) or polymer blend (samples 25 and 29-31) (i.e., dosages were the amount of polymer added not the amount of the separation aid which included the polymer and the viscosity modifier). The mixture was shaken vigorously for 5 seconds, centrifuged at 5000 rpm and held for 1 minute, and then slowed to stop using the break setting. Oil separation was rated on a 1-3 ranking: (1) shows little to no oil separation; (2) shows moderate oil separation; and (3) shows large amounts of oil separation.

Table 5 shows the separation test results and recovery aid compositions for samples 19-31:

| | | Dosage ppm | | | | |
|---|---|---|---|---|---|---|
| Recovery Aid | Designation | 150 | 200 | 250 | 300 | 350 |
| 19 | Pluronic 31 | 1 | 1 | 1 | 1 | 1 |
| 20 | Pluronic 62 | 2 | 2 | 3 | 3 | 3 |
| 21 | Pluronic 64 | 2 | 3 | 3 | 3 | 3 |

-continued

| | | Dosage ppm | | | | |
|---|---|---|---|---|---|---|
| Recovery Aid | Designation | 150 | 200 | 250 | 300 | 350 |
| 22 | Pluronic 68 | 1 | 1 | 1 | 1 | 1 |
| 23 | Pluronic 122 | 1 | 1 | 1 | 2 | 2 |
| 24 | Pluronic 90R4 | 2 | 2 | 2 | 2 | 2 |
| 25 EO-PO/EO-PO | Pluronic 64/122 | 3 | 3 | 3 | 3 | 3 |
| 26 poloxamine | Tetronic 701 | 1 | 1 | 1 | 2 | 2 |
| 27 | Tetronic 904 | 2 | 2 | 2 | 2 | 2 |
| 28 | Tetronic 908 | 1 | 1 | 1 | 1 | 1 |
| 29 poloxamine/poloxamine | 701/908 | 1 | 1 | 1 | 1 | 1 |
| 30 EO-PO/ | 64/904 | 2 | 2 | 2 | 2 | 2 |
| 31 poloxamine | 908/90R4 | 3 | 3 | 3 | 3 | 3 |

What is claimed:

1. A method comprising:
   adding an oil recovery aid that consists essentially of a polymer selected from a polyethyleneoxide-polypropyleneoxide block copolymer, a poloxamine, and a mixture or aqueous composition thereof to a corn-to-ethanol process stream,
   wherein the oil recovery aid provides an Oil Separation Rating of 3 by Separation Testing at a polymer dosage of 150 ppm.

2. The method of claim 1, wherein the polymer includes a polyethyleneoxide-polypropyleneoxide block copolymer.

3. The method of claim 2, wherein the polymer includes a mixture of polyethyleneoxide-polypropyleneoxide block copolymers.

4. A method comprising:
   adding a polymer selected from a poloxamine and a mixture of the poloxamine and a polyethyleneoxide-polypropyleneoxide block copolymer to a corn-to-ethanol process stream,
   wherein the polymer provides an Oil Separation Rating of at least 2 by Separation Testing via direct addition of a polymer dosage of 150 ppm to 350 ppm,
   wherein the a poloxamine has a formula $(R^1)_2N[(CH_2)_mNR^1]_pR^1$, wherein each $R^1$ is, independently, selected from a hydrogen atom, a hydroxyethyl group, a hydroxypropyl group, a polyethyleneoxide group, a polypropyleneoxide group, a polyethyleneoxide-polypropyleneoxide group, a polypropyleneoxide-polyethyleneoxide group, a glycol, a glycol ester, a polyglycol, or a polyglycol ester; m ranges from 1 to 10; and p ranges from 1 to 10.

5. The method of claim 4, wherein the polymer includes a mixture of poloxamines.

6. The method of claim 4, wherein the polymer includes a poloxamine and a polyethyleneoxide-polypropyleneoxide block copolymer.

* * * * *